United States Patent
Rodden et al.

(10) Patent No.: US 6,454,217 B1
(45) Date of Patent: Sep. 24, 2002

(54) METHOD AND APPARATUS FOR RATE INTEGRATION SUPPLEMENT FOR ATTITUDE REFERENCING WITH QUATERNION DIFFERENCING

(75) Inventors: John James Rodden, Los Altos; Xenophon Price, Redwood City, both of CA (US); Stephane Carrou, Ramonville Saint Agne (FR); Homer Darling Stevens, Redwood City, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/670,904

(22) Filed: Sep. 28, 2000

(51) Int. Cl.$^7$ .................................................. B64G 1/24
(52) U.S. Cl. .......................... 244/164; 244/171; 701/13
(58) Field of Search ................................ 244/164, 165, 244/169, 170, 171; 701/13

(56) References Cited

U.S. PATENT DOCUMENTS

| | | | | |
|---|---|---|---|---|
| 5,109,346 A | * | 4/1992 | Wertz | 244/164 |
| 5,822,515 A | * | 10/1998 | Baylocq | 701/4 |
| 6,047,226 A | * | 4/2000 | Wu et al. | 244/165 |
| 6,053,455 A | * | 4/2000 | Price et al. | 244/169 |
| 6,061,611 A | * | 5/2000 | Whitmore | 244/194 |
| 6,108,594 A | * | 8/2000 | Didinsky et al. | 244/164 |
| 6,142,422 A | * | 11/2000 | Stoen et al. | 244/171 |
| 6,154,691 A | * | 11/2000 | Bailey | 244/165 |
| 6,240,367 B1 | * | 5/2001 | Lin | 701/214 |
| 6,266,616 B1 | * | 7/2001 | Needelman | 701/13 |
| 6,285,927 B1 | * | 9/2001 | Li et al. | 244/164 |

OTHER PUBLICATIONS

Daniel Johnson et al, "Alogorithm design and mission application for a low cost integrated attitude determination, navigation and control system" Honeywell inc. unknown date.*

Matthew a. Dean, "precision orbit and attitude determination for the ICESat mission", ASEN 5060 final report, May 6, 2001.*

* cited by examiner

Primary Examiner—Galen L. Barefoot
(74) Attorney, Agent, or Firm—Perman & Green, LLP

(57) ABSTRACT

A control system for providing attitude control in spacecraft. The control system comprising a primary attitude reference system, a secondary attitude reference system, and a hyper-complex number differencing system. The hyper-complex number differencing system is connectable to the primary attitude reference system and the secondary attitude reference system.

23 Claims, 10 Drawing Sheets

METHOD AND APPARATUS FOR RATE INTEGRATION SUPPLEMENT FOR ATTITUDE REFERENCING WITH QUATERNION DIFFERENCING

The U.S. Government has a paid-up license in this invention and the right in limited circumstances to require the patent owner to license others on reasonable terms as provided for by the terms of contract number NAS7-1260 awarded by the National Aeronautics and Space Administration (NASA).

BACKGROUND OF THE INVENTION

1. Field of the Invention

The present invention relates to systems for attitude control of Earth-orbiting satellites and, more particularly, to methods and systems for controlling spacecraft attitude.

2. Prior Art

Star trackers are the nominal non-inertial attitude reference system providing non-inertial attitude reference data. Other sensors, such as magnetometers and sun sensors also provide non-inertial attitude reference data. Star trackers are electro-optical devices that focus a field of view of a segment of the sky onto a detector that measures x-y positions of star images within the detection coordinates. The measured x-y positions of the stars are signal processed and identified by mapping the positions to a star position catalog generally pre-stored in memory. After star identification further processing determines the instantaneous spacecraft attitude or orientation with respect to stellar inertial coordinates. Comparing the instantaneous attitude with the ordered attitude generally results in differences in body coordinates pitch, roll, and/or yaw. An error signal is then generated to correct for the differences between the actual attitude and the ordered attitude.

When star-tracker operation is interrupted by a stellar body blocking the star-tracker's field of view, e.g., the sun or moon, the non-inertial attitude reference data provided by the star-tracker is also interrupted. An alternative to non-inertial attitude reference systems are inertial attitude reference systems. Inertial reference systems are typically rate sensors that detect angular rates of change of the spacecraft's attitude with respect to an inertial coordinate system. Inertial reference systems can be mechanical gyro devices, optical devices, such as ring laser gyros, or fiber optic gyros. However, inertial reference systems are subject to drift and must be re-calibrated periodically to eliminate the drift error introduced into the attitude data. A problem arises when the non-inertial attitude reference system is unavailable and the inertial attitude reference system is providing attitude reference data with an unknown drift error.

SUMMARY OF THE INVENTION

In accordance with one embodiment of the invention a control system for providing attitude control in spacecraft is provided. The control system comprises a primary attitude reference system, a secondary attitude reference system, and a hyper-complex number differencing system. The hyper-complex number differencing system is connectable to the primary attitude reference system and the secondary attitude reference system.

In accordance with another embodiment the invention includes a method for providing attitude control data in spacecraft. The method comprises the steps of providing non-inertial attitude reference (NAR) data derived from a non-inertial source, providing backup inertial attitude reference (IAR) data when NAR data is not available, and utilizing NAR data when available to correct for drift errors in IAR data.

In accordance with another embodiment of the invention, an improved spacecraft attitude control system is provided. The improved space control system comprising A quaternion format differencing system for Attitude Referencing control in a spacecraft, the system comprising a star-tracker reference system, wherein the star-tracker reference system comprises a first quaternion data generator, a body control module for producing orthogonal axes body control reference torques, and a quaternion comparator connectable to the star-tracker reference system and the body control module.

The invention is also directed to a computer readable medium embodying program code for providing attitude control data in spacecraft. The method comprises the steps of providing non-inertial attitude reference (NAR) data derived from a non-inertial source, providing backup inertial attitude reference (IAR) data when NAR data is not available, and utilizing NAR data when available to correct for drift errors in IAR data.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
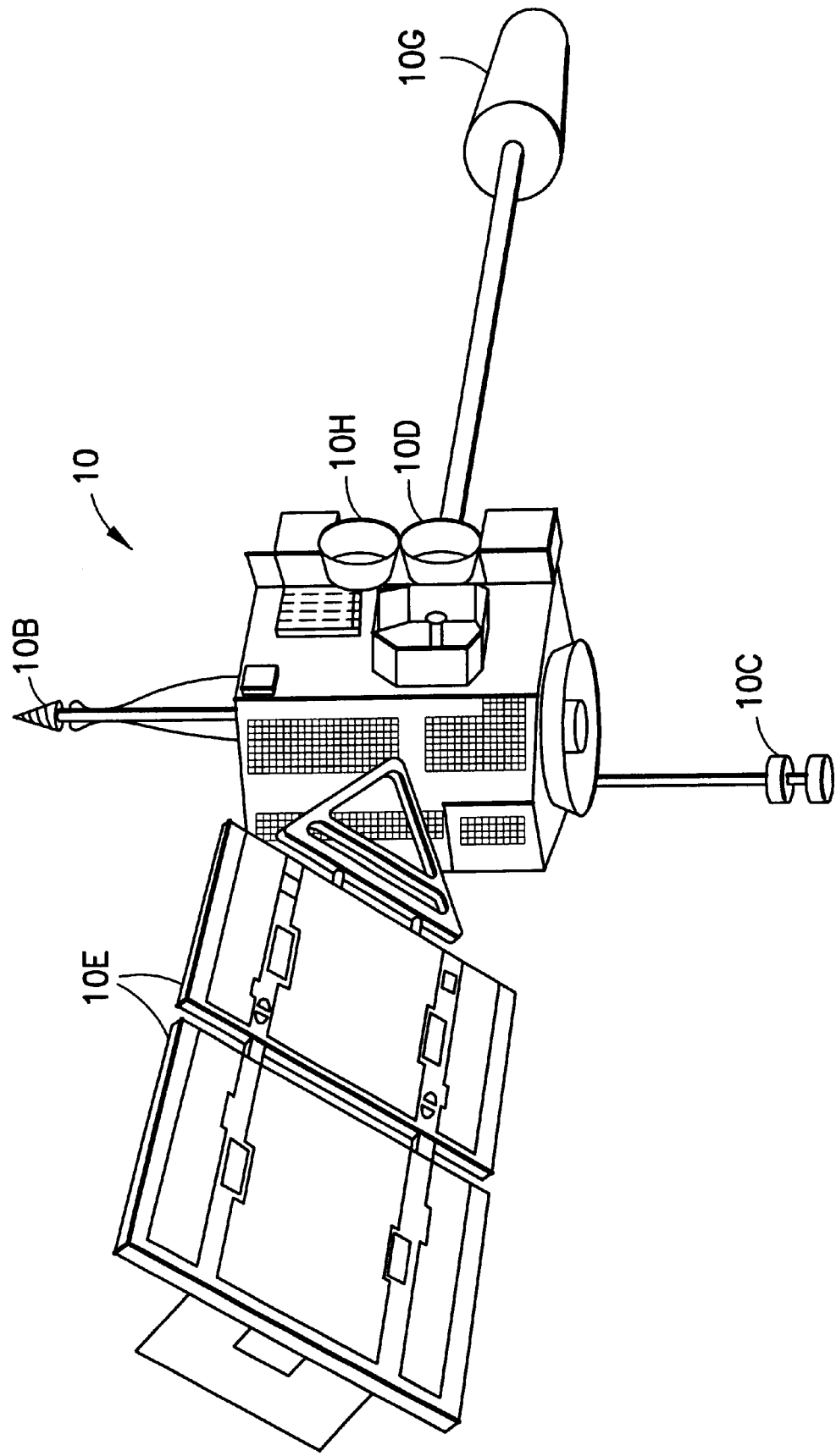
FIG. 1 is a diagrammatic illustration of a spacecraft with solar arrays and sensors.

Referring to FIG. 1, there is shown a perspective view of a spacecraft incorporating features of the present invention. Although the present invention will be described with reference to the embodiments shown in the drawings, it should be understood that the present invention can be embodied in many alternate forms of embodiments. FIG. 1 illustrates the various devices onboard a spacecraft requiring orientation towards a particular reference. For example, attitude control is necessary to maintain solar panels 10E of a solar-powered satellite 10 to continuously face the sun at optimal angle as the satellite orbits the earth. Other onboard devices such as antennas 10B, magnetometers 10H Earth sensors 10C also require attitude reference control to maintain orientation towards a particular direction, (i.e., towards Earth) while maintaining orientation of solar devices such as solar sail 10G.

Figure 2:
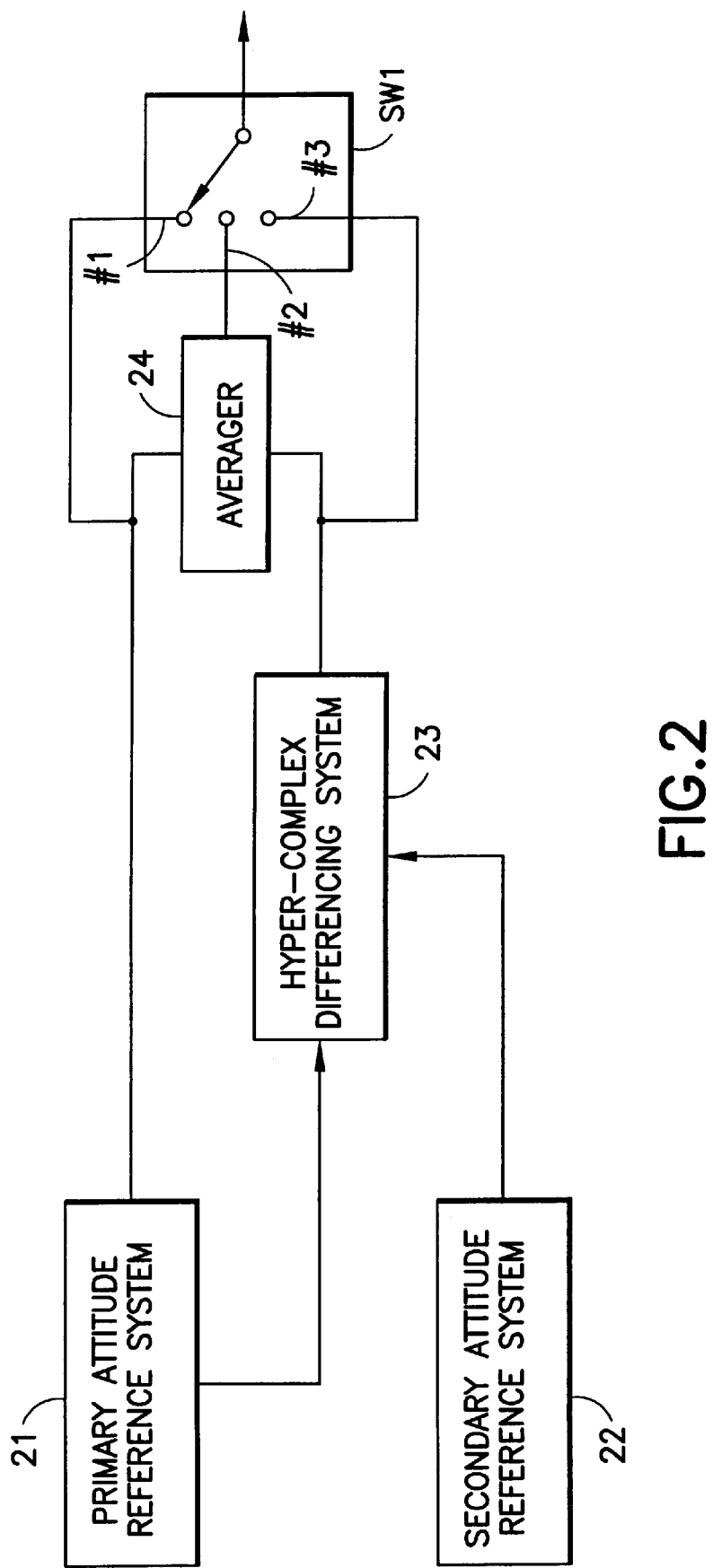
FIG. 2 is a block diagram of a system incorporating features of the present invention.

Referring now to FIG. 2 there is shown a block diagram of a system incorporating features of the present invention. The primary attitude reference system 21 (i.e., a non-inertial reference system) provides a quaternion vector relating the spacecraft attitude with respect to inertial coordinates to hyper-complex differencing system 23, averager 24, and switch SW1. The secondary attitude reference system 22 provides spacecraft attitude reference in inertial coordinates. In the hyper-complex differencing system 23 the inertial coordinates are converted to quaternion vector format and compared with the quaternion vector provided by the primary attitude reference system 21. Using the comparison results, the hyper-complex differencing system 23 compensates the inertial reference for inherent inertial drift in the secondary attitude reference system. In this manner the hyper-complex differencing system 23 provides automatic drift evaluation and compensation for the secondary attitude reference system. With continuous drift compensation the inertial based attitude reference system can be use separately as an attitude reference for a duration compatible with drift stability. The compensated inertial reference is presented as an input to averager 24 and switch SW1. It is readily appreciated that SW1 allows the selection of primary attitude reference system data, drift compensated secondary attitude reference system data, or averaged primary attitude reference system data and drift compensated secondary attitude reference system data. It is further readily appreciated that loss of the primary attitude reference system 21 merely results in the drift compensated secondary attitude reference system 22 becoming the primary attitude reference system while the primary is unavailable. It is also readily appreciated that the output of averager 24 provides an averaged attitude control signal with reduced noise.

Figure 6:
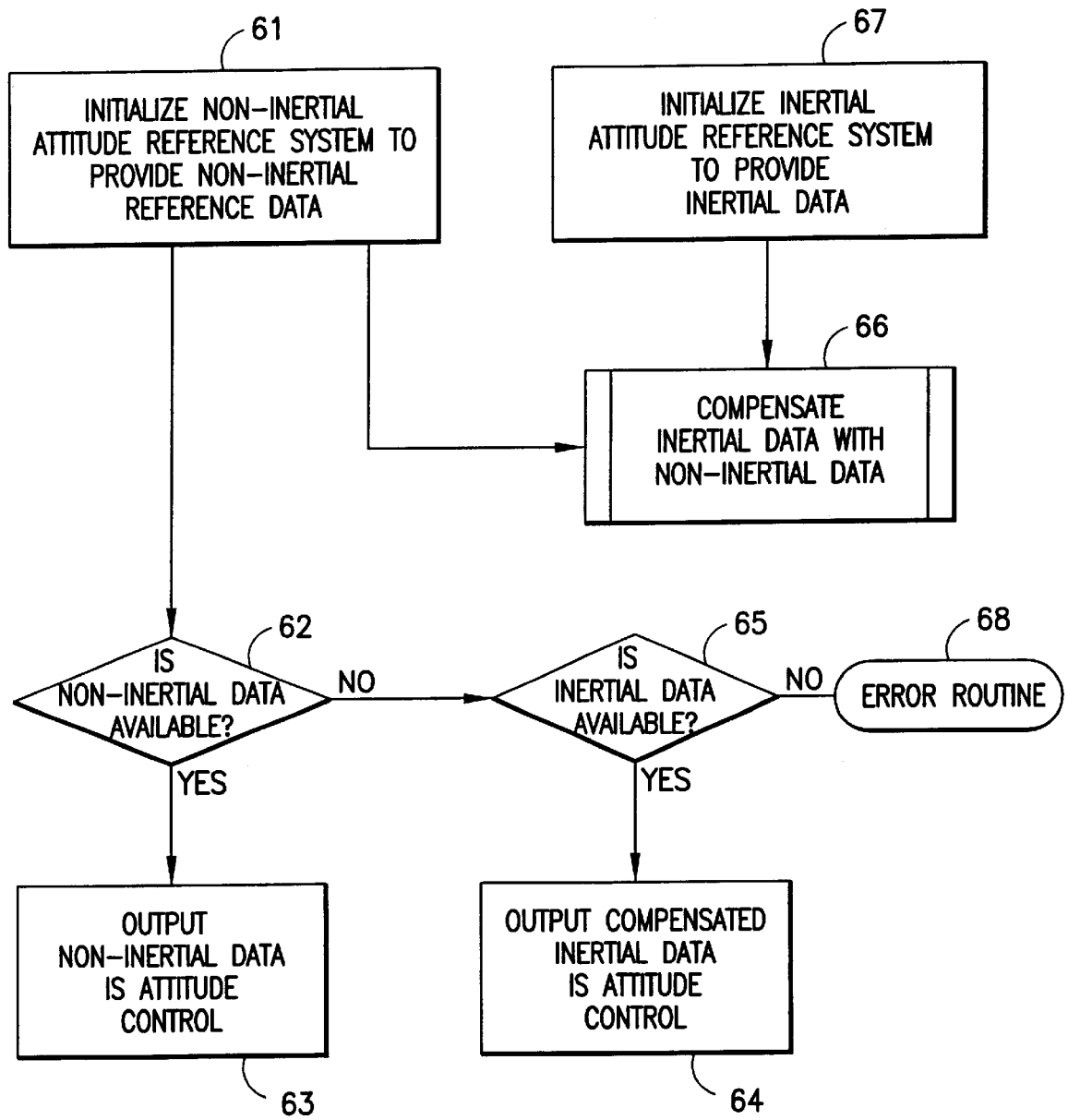
FIG. 6 is a flowchart of a method incorporating features of the system shown in FIG.2.

Referring now also to FIG. 6 there is shown a flowchart of a method incorporating features of the system shown in FIG.2. The primary attitude reference system or non-inertial attitude reference system is initialized 61 to provide non-inertial attitude reference data. Similarly, the secondary attitude reference system or inertial attitude reference system is initialized 67 to provide inertial attitude reference data. The output of the primary attitude reference system (FIG. 2, item 21) is bifurcated to a decision operation 62 and compensator step 66. The compensator step 66 compensates for the drift inherent in inertial attitude reference systems and is described more fully in FIG. 8-item 56a, FIG. 9-item 56b, and FIG. 10-item 56c.

The decision operation 62 determines if the non-inertial data is available. If the decision operation results in an affirmative response the non-inertial data is outputted 63 to attitude control. Alternatively, the decision operation 62 may result in a negative response which in turn invokes another decision operation 65 to determine if compensated inertial data is available. If the decision operation 65 results in an affirmative response the compensated inertial data is outputted 64 to attitude control. Otherwise, a negative response from decision operation 65 results in error routine 68.

Figure 7:
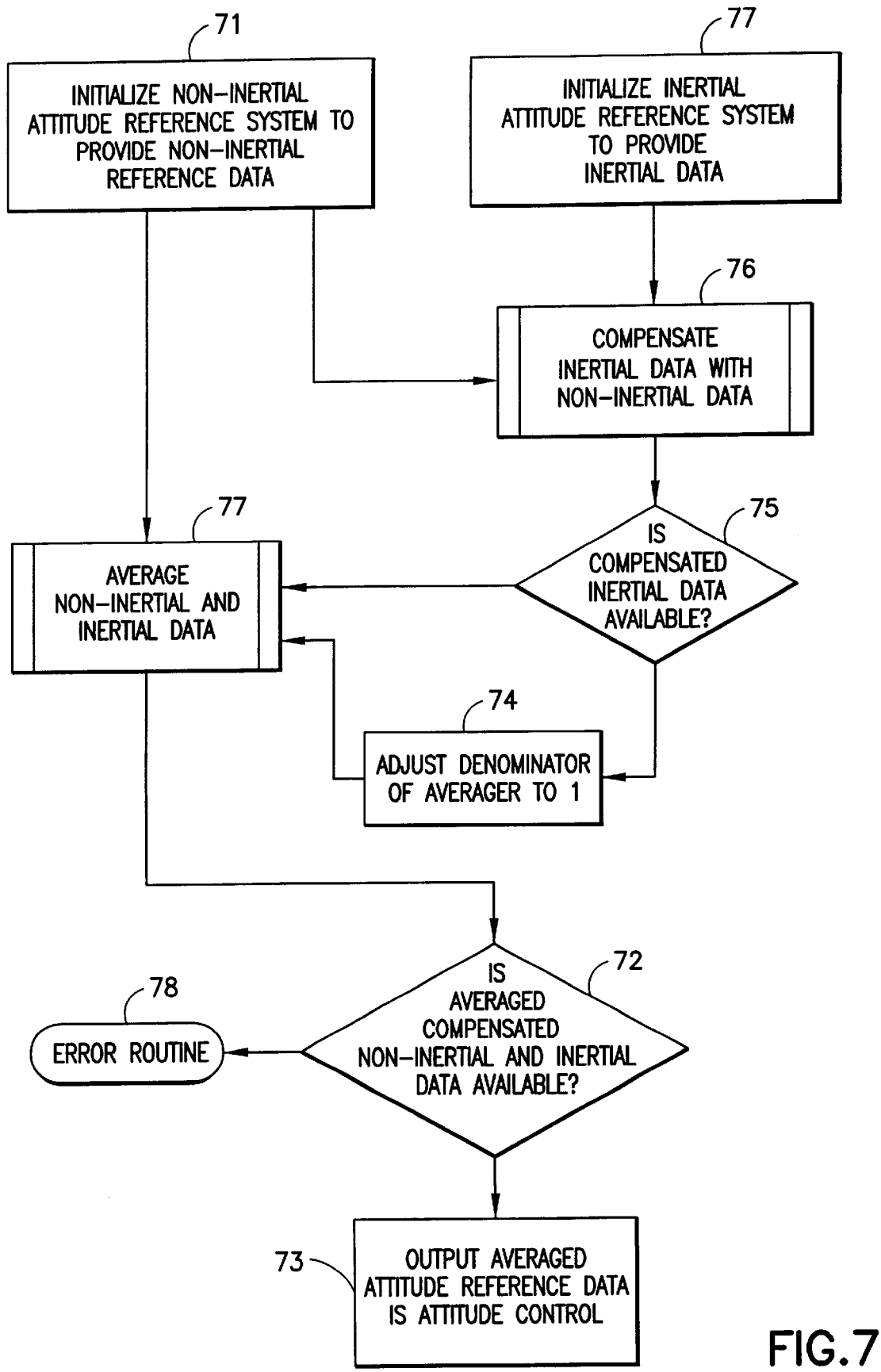
FIG. 7 is a flowchart of an alternate method incorporating features of the system shown in FIG.2.

Referring now to FIG. 7 there is shown a flowchart of an alternate method incorporating features of the system shown in FIG. 2. The primary attitude reference system or non-inertial attitude reference system is initialized 71 to provide non-inertial attitude reference data. Similarly, the secondary attitude reference system or inertial attitude reference system is initialized 77 to provide inertial attitude reference data. The output of the primary attitude reference system (FIG. 2, item 21) is bifurcated to an averaging step 77 and compensator step 76. The compensator step 76 compensates for the drift inherent in inertial attitude reference systems and is described more fully in FIG. 8-item 56a, FIG. 9-item 56b, and FIG. 10-item 56c.

A decision operation 75 determines if the compensated inertial data is available. If the result of the decision operation 75 is affirmative the compensated inertial data is averaged 77 with the non-inertial data from the non-inertial reference system (FIG. 2, item 21). A negative result of the decision operation 75 results in an adjustment 74 of the averager denominator to equal one. This adjustment effectively permits the averager (FIG. 2, item 24) to output the non-inertial data only. A second decision operation step 72 determines if averaged data is available. An affirmative response results in the output 73 of the average attitude reference data to attitude control. A negative response results in error routine step 78.

Figure 3:
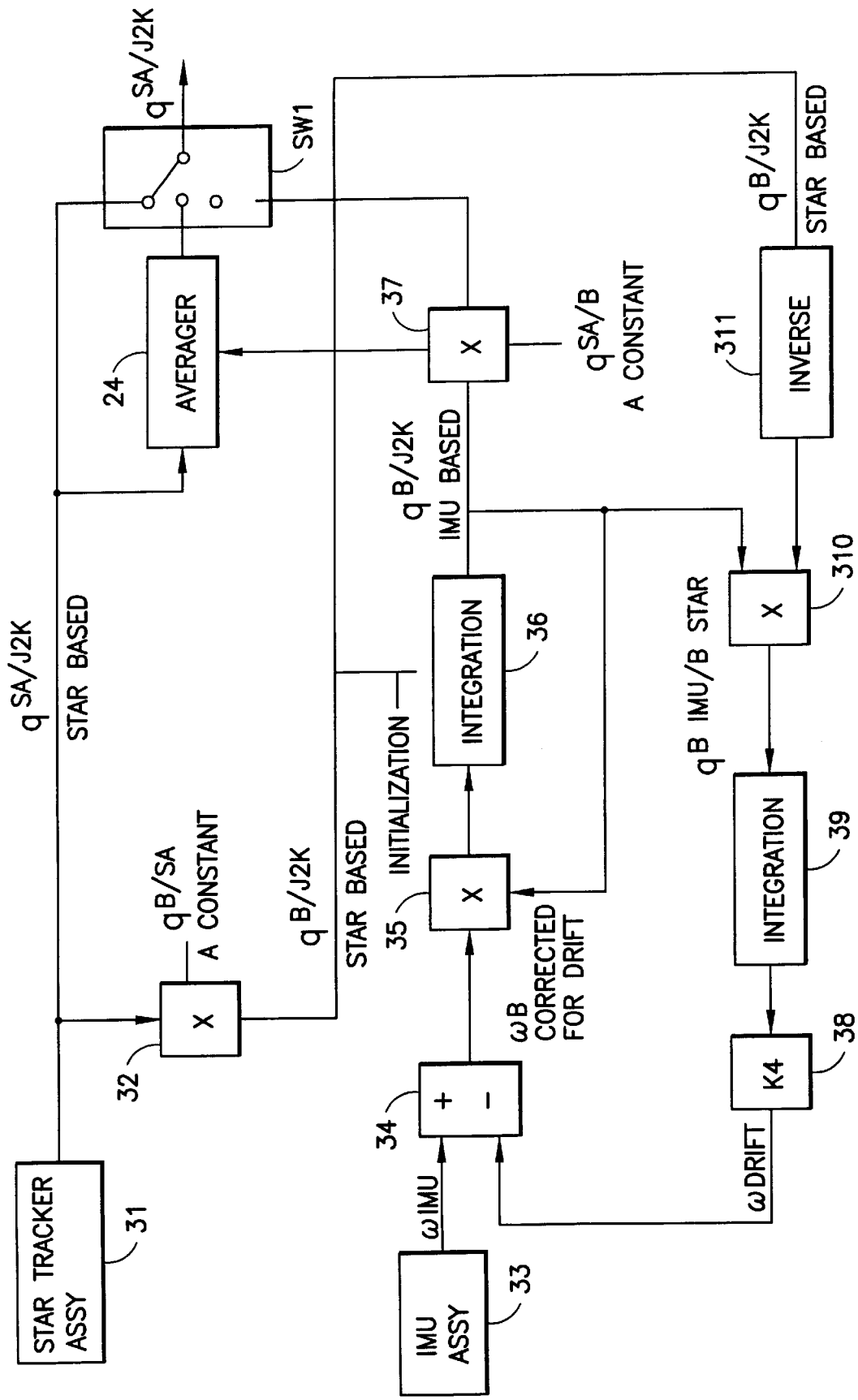
FIG. 3 is a block diagram of a system incorporating features of one embodiment of the present invention.
Figure 8:
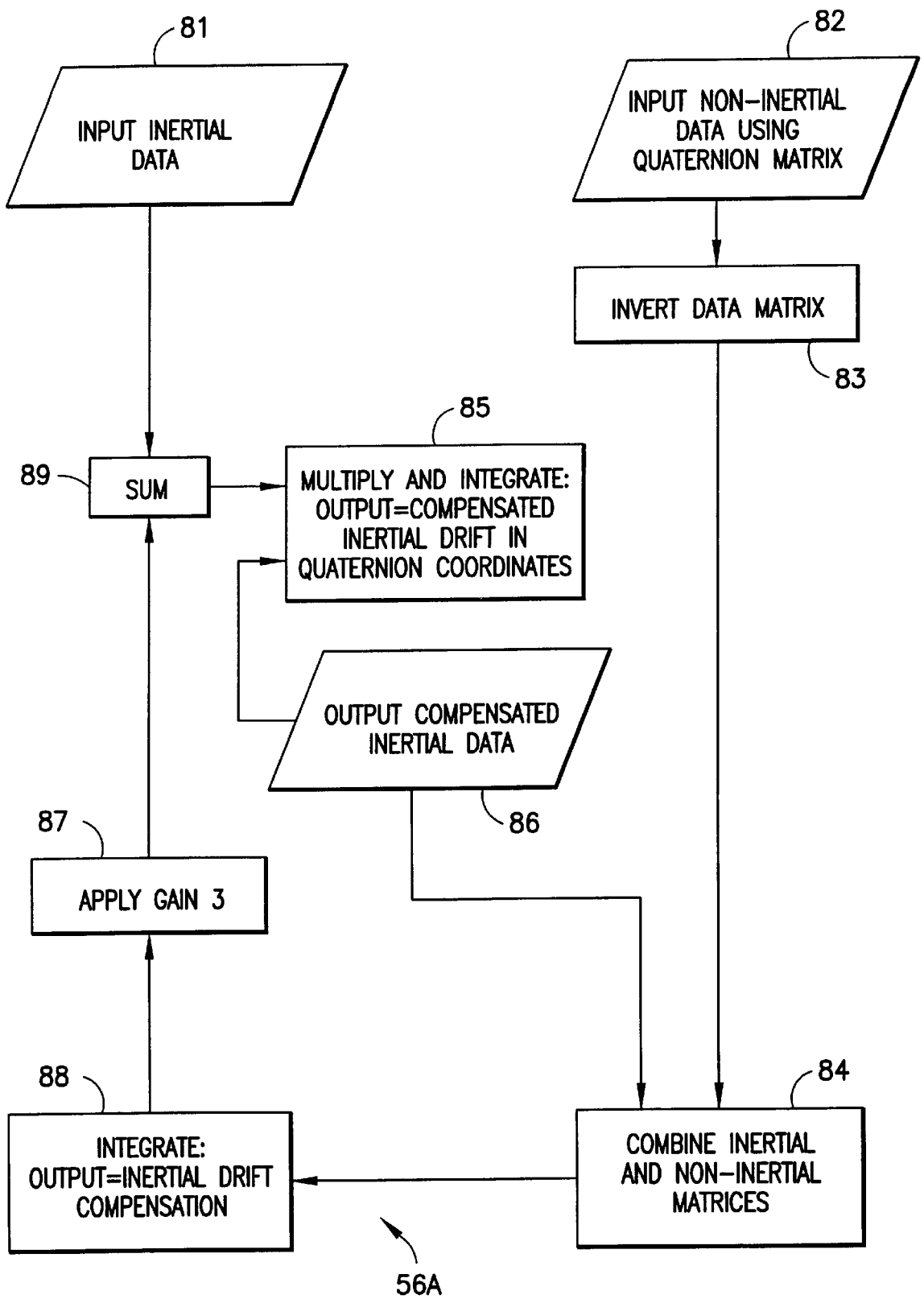
FIG. 8 is an expanded flowchart of one method of compensating inertial data with non-inertial data shown in FIG. 3 and FIGS. 6 or 7.

Referring now to FIGS. 3 and 8 there is shown a block diagram of a system incorporating features of one embodiment of the present invention and an expanded flowchart of one method of compensating inertial data with non-inertial data shown in FIG. 3 and FIGS. 6 or 7, respectively. Star-tracker assembly 31 is initialized to provide attitude reference in quaternion format to switch SW1, averager 24, and multiplier 32. The quaternion format from the star-tracker assembly 31 is star assembly referenced with respect to a Julian astronomical calendar to provide star-based matrix $q^{SA/J2K}$ which is converted in multiplier 32 by multiplying by a constant $q^{B/SA}$ resulting in $q^{B/J2K}$; $q^{B/J2K}$ is inverted by inverter 311 and step 83. The output of inverter 311 is combined 84 with compensated inertial data $q^{B/J2K}$ from integrator 36 in multiplier 310. The output of multiplier 310 is integrated 88 by integrator 39 to convert the quaternion vector $q^{B\ IMU/Bstar}$ to inertial parameters. Stability gain is applied 87 by device 38. The output of device 38 is the comparative difference between the inertial and non-inertial attitude reference systems and represents the drift associated with the inertial attitude reference system. The difference is summed 89 in summer 34. The output of summer 34 is multiplied by $q^{B/J2K}$ and integrated, step 85, in multiplier 35 and integrator 36, respectively. The output of integrator 36 is compensated inertial attitude reference in quaternion format: $q^{B/J2K}$, multiplied by $q^{SA/B}$ by multiplier 37 to form IMU or inertial based $q^{SA/J2K}$, and outputted 86 to averager 24 and switch SW1. It is readily appreciated that the compensated quaternion matrix $q^{SA/J2K}$ outputted 86 from multiplier 37 is derived from an inertial attitude reference system 33. It is also readily appreciated that the compensated quaternion matrix $q^{SA/J2K}$ derived from the inertial attitude reference system 33 is similar in form to quaternion matrix $q^{SA/J2K}$ derived from the non-inertial attitude reference system 31.

It is also readily appreciated that the attitude reference data within the inertial and non-inertial based quaternion matrixes is identical or close to identical at the point that the non-inertial attitude reference system is no longer available. Thus allowing the inertial system to replace, at least temporarily, the non-inertial system. This is readily illustrated by way of example and by referring again to FIG. 2. In this example the primary attitude reference system 21 is referred to as a star-based attitude reference system. The secondary attitude reference system 22 is referred to as the IMU or gyroscopic attitude reference system. In alternate embodiments the gyroscopic attitude reference system primary system and the star-based system could be the secondary. Referring now to FIG. 2, the star-based reference system 21 outputs star-based matrix $q^{SA/J2K}$. The system uses star-based $q^{SA/J2K}$ to continuously update and compensate the reference data provided by the gyroscopic attitude reference system. Thus, when the star-based system is unavailable (such as when the star sensors are blocked by the sun or the moon), SW1 switches to input #3. When the star-based system becomes available again, SW1 switches to either input #1 or #2, depending on preference of the user.

Figure 4:
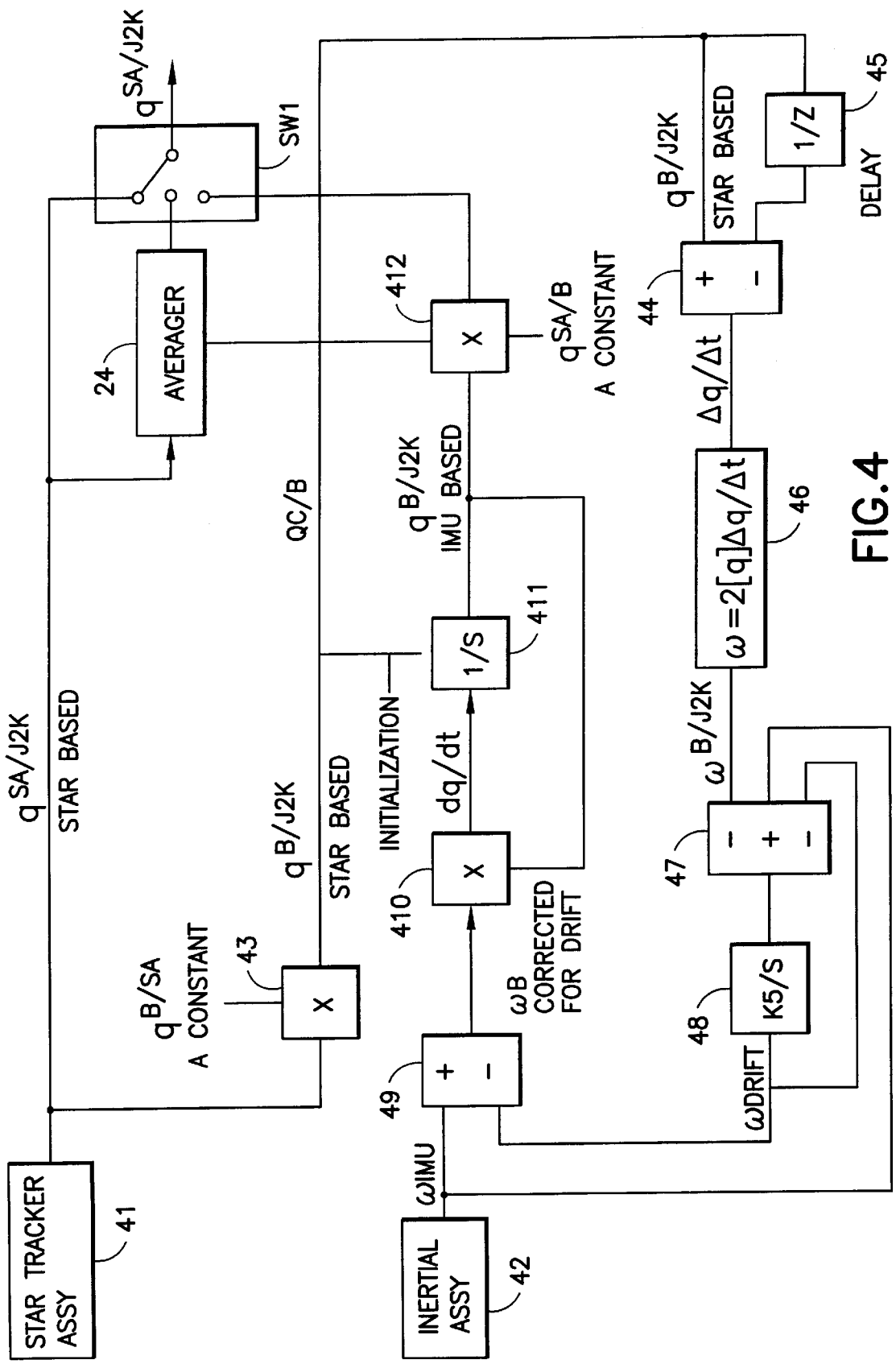
FIG. 4 is a block diagram of a system incorporating features of an alternate embodiment of the present invention.
Figure 10:
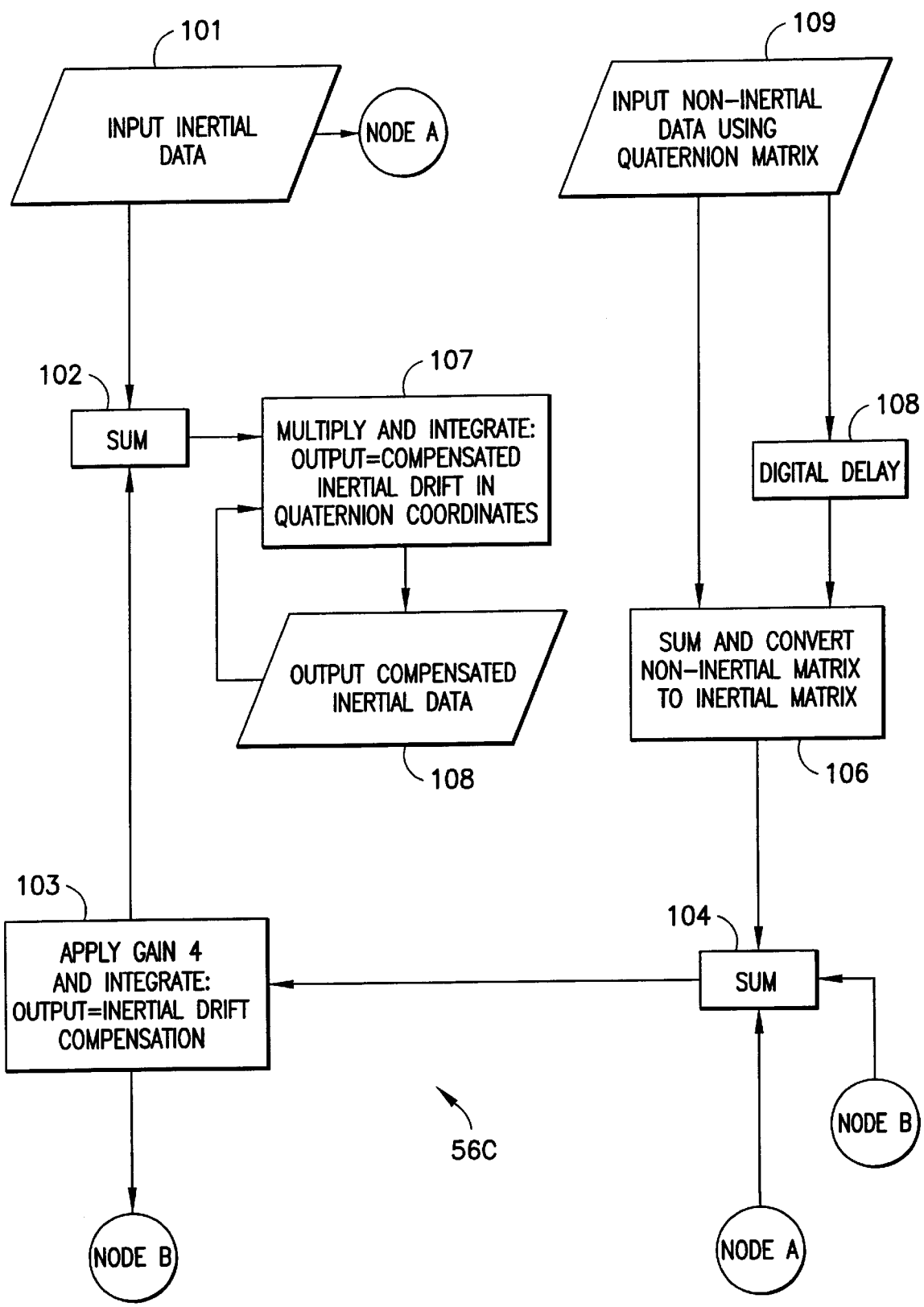
FIG. 10 is an expanded flowchart of an alternate method of compensating inertial data with non-inertial data shown in FIG. 5 and FIGS. 6 or 7.

Referring now to FIGS. 4 and 10 there is shown a block diagram of a system incorporating features of an alternate embodiment of the present invention, and an expanded flowchart of an alternate method of compensating inertial data with non-inertial data shown in FIG. 4 and FIGS. 6 or 7, respectively. Star-tracker assembly 41 is initialized to provide attitude reference in quaternion format to switch SW1, averager 24, and multiplier 43. The quaternion format from the star-tracker assembly 41 is star assembly referenced with respect to a Julian astronomical calendar: $q^{SA/J2K}$, which is converted in multiplier 43 by multiplying by a constant $q^{B/SA}$ resulting in $q^{B/J2K}$; $q^{B/J2K}$ is digitally delayed 108 in delay device 45. The output of delay device 45 is summed with the non-delayed quaternion matrix $q^{B/J2K}$ and converted 106 to inertial coordinates by converter 46. The output of converter 46 is summed 104 in summer 47 with inertial attitude reference data 101 and inertial drift compensation derived 103 from gain/integrator device 48. The summer 47 output is integrated and amplified 103 to provide an inertial drift compensation summed 102 with input inertial data in summer 49. The output of summer 49 is multiplied by feedback $q^{B/J2K}$ and integrated 107 by multiplier 410 and integrator 411, respectively. The output of integrator 411 is compensated inertial attitude reference in quaternion format $q^{B/J2K}$ multiplied by $q^{SA/B}$ by multiplier 412 and outputted 105 to averager 24 and switch SW1. It is readily appreciated that the compensated quaternion matrix $q^{SA/J2K}$ outputted 105 from multiplier 412 is derived from an inertial attitude reference system 42. It is also readily appreciated that the compensated quaternion matrix $q^{SA/J2K}$ derived from the inertial attitude reference system 42 is identical in form to quaternion matrix $q^{SA/J2K}$ derived from the non-inertial attitude reference system 41.

Figure 5:
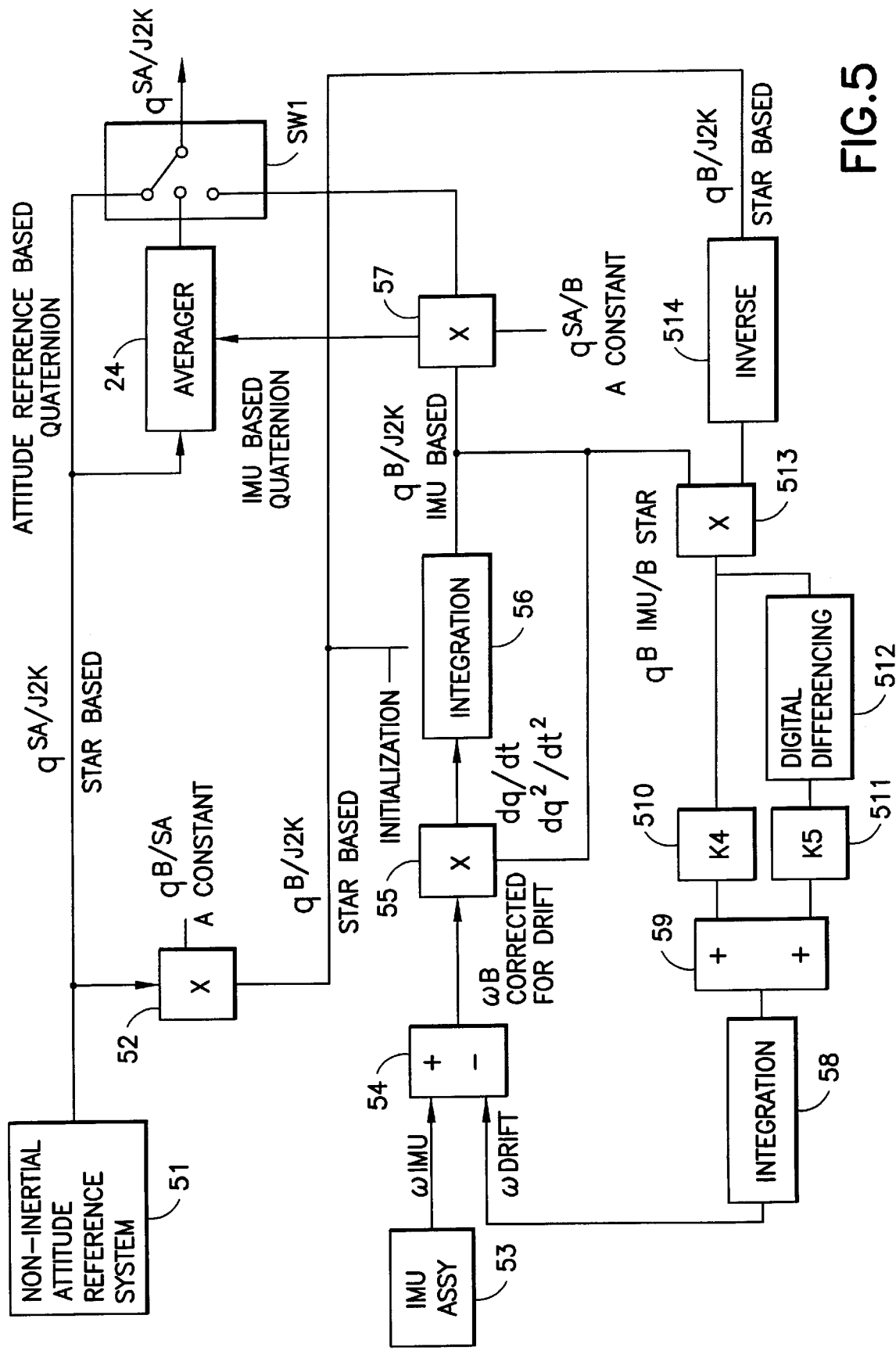
FIG. 5 is a block diagram of a system incorporating features of an alternate embodiment of the present invention.
Figure 9:
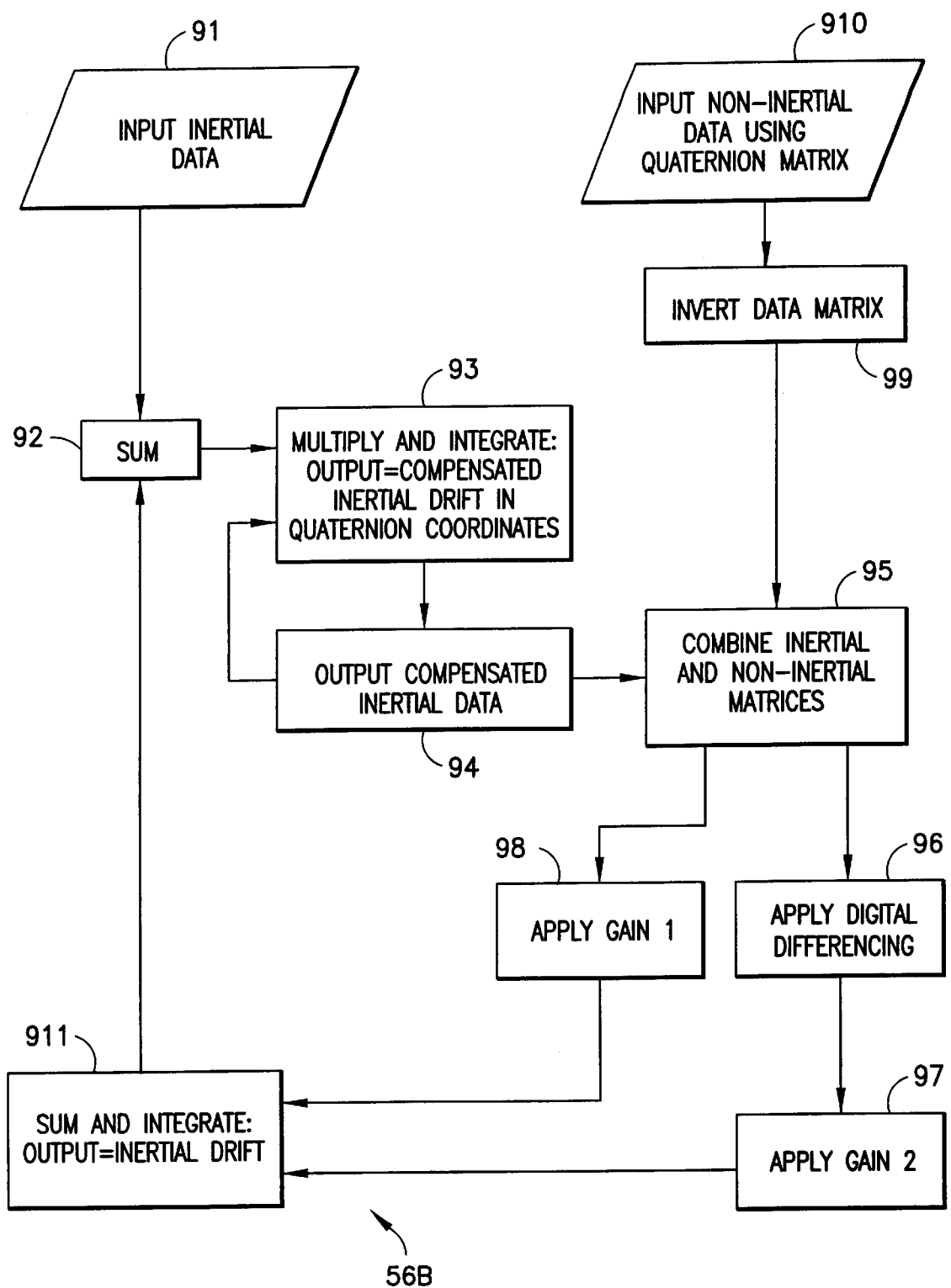
FIG. 9 is an expanded flowchart of an alternate method of compensating inertial data with non-inertial data shown in FIG. 4 and FIGS. 6 or 7.

Referring now to FIGS. 5 and 9, there is shown a block diagram of a system incorporating features of an alternate embodiment of the present invention, and an expanded flowchart of an alternate method of compensating inertial data with non-inertial data shown in FIG. 5 and FIGS. 6 or 7, respectively. The non-inertial attitude reference system 51 is initialized to provide attitude reference in quaternion format to switch SW1, averager 24, and multiplier 52. The quaternion format from the non-inertial attitude reference assembly 51 is star assembly referenced with respect to a Julian astronomical calendar: $q^{SA/J2K}$, for example, which is converted in multiplier 52 by multiplying by a constant $q^{B/SA}$ resulting in $q^{B/J2K}$; $q^{B/J2K}$ is inputted 910 to inverter 514 where $q^{B/J2K}$ is inverted. The non-inertial based and now inverted matrix $q^{B/J2K}$ is combined 95 in multiplier 513 with a second $q^{B/J2K}$ derived from the inertial system. The output of multiplier 513 is bifurcated to digital differencing device 512 where digital differencing is applied 96 before applying 97 gain in gain device 511. The other bifurcated output of multiplier 513 is amplified 98 in gain device 510. The outputs of gain devices 510, 511 are summed and integrated 911 in summer 59 and integrator 58, respectively. The output of integrator 58 represents the drift associated with the inertial device 53. The output of integrator 58 is summed 92 in summer 54 producing inertial attitude reference coordinates compensated for drift. The output from summer 54 is multiplied and integrated 93 in multiplier 55 and integrator respectively producing the compensated inertial based quaternion matrix $q^{B/J2K}$. The matrix $q^{B/J2K}$ is multiplied in multiplier 57 by matrix $q^{SA/B}$ producing a quaternion matrix $q^{SA/J2K}$ from multiplier 57. It is readily appreciated that the compensated quaternion matrix $q^{SA/J2K}$ outputted 94 from multiplier 57 is derived from an inertial attitude reference system 53. It is also readily appreciated that the compensated quaternion matrix $q^{SA/J2K}$ derived from the inertial attitude reference system is identical in form to quaternion matrix $q^{SA/J2k}$ derived from the non-inertial attitude reference system 51.

Advantageously, features of the invention provide attitude reference data in quaternion matrixes $q^{SA/J2K}$ from non-inertia and inertial attitude reference systems. It is readily appreciated from the descriptions above that the quaternion data derived from the inertial attitude reference system is continuously updated by the non-inertial system; thereby eliminating the problem of periodically re-calibrating inertial reference systems. It should also be appreciated that when the non-inertial attitude reference system is unavailable, the inertial attitude reference system provides attitude reference data, compensated for drift error, to the attitude reference controller resulting in uninterrupted attitude control.

It should be understood that the foregoing description is only illustrative of the invention. Various alternatives and modifications can be devised by those skilled in the art without departing from the invention. For example, quaternions are a special class of hyper-complex numbers. Other classes of hyper-complex numbers or matrixes representing attitude control reference could also be devised. Accordingly, the present invention is intended to embrace all such alternatives, modifications and variances which fall within the scope of the appended claims.

What is claimed is:

1. A control system for providing attitude control in spacecraft, the control system comprising:
   a primary attitude reference system;
   secondary attitude reference system; and
   a hyper-complex number differencing system connectable to the primary attitude reference system and the secondary attitude reference system and adapted to provide a drift error correction signal to the secondary system when the primary system is unavailable.

2. A control system as in claim 1 wherein the primary attitude reference system comprises a non-inertial attitude reference system.

3. A control system as in claim 2 wherein the non-inertial reference system comprises a star-tracker system.

4. A control system as in claim 1 wherein the secondary attitude reference system comprises an inertial attitude reference system.

5. A control system as in claim 4 wherein the inertial attitude reference system comprises a gyroscopic control system.

6. A control system as in claim 1 wherein the hyper-complex number differencing system comprises a quaternion differencing system.

7. A control system as in claim 1 wherein the control system further comprises:
   an averager; and
   a selector connectable to the hyper-complex number differencing system, the primary attitude reference system, and the averager.

8. The control system of claim 1, wherein the primary attitude reference system is a star tracker system and the secondary attitude system is an integrated IMU measurement system, wherein the integrate IMU system is adapted to replace the primary attitude reference system using integrated IMU data, generate by the hyper-complex number differencing system.

9. The control system of claim 8, wherein the hyper-complex number differencing system is adapted to estimate an IMU bias measurement based on a difference between an integrated IMU quaternion and a star tracker attitude quaternion.

10. The control system of claim 8, wherein the hyper-complex number differencing system is adapted to continuously estimate an IMU bias measurement when the star tracker system is functioning.

11. The control system of claim 1 wherein an integrated IMU measurement provided by the hyper-complex number differencing system is used in place of primary attitude reference system data when the primary reference system is not functional.

12. The control system of claim 1 wherein the drift error is a function of an angular rate measurement of the primary system integrated into an attitude quaternion and an integrated IMU quaternion.

13. A method for providing attitude control data in spacecraft, the method comprising the steps of:
providing non-inertial attitude reference (NAR) data derived from a non-inertial source;
providing backup inertial attitude reference (IAR) data when NAR data is not available; and
utilizing NAR data when available to correct for drift errors in IAR data.

14. A method as in claim 13 wherein the step of providing NAR data from a non-inertial source further comprises the step of providing NAR data from a star-tracker system.

15. A method as in claim 13 wherein the step of providing IAR data further comprises the step of converting IAR data to quaternion format.

16. A method as in claim 13 wherein the step of providing IAR data further comprises the step of providing IAR data from a gyroscopic reference system.

17. The method of claim 13 wherein the step of providing backup inertial attitude reference data further comprises the steps of:
integrating IMU signals to create an attitude quaternion; and
using a difference between the integrated IMU quaternion and a quaterion provided from the non-inertial attitude reference data to estimate an IMU bias, wherein the IMU bias is used to correct for drift errors.

18. A quaternion format differencing system for Attitude Referencing control in a spacecraft, the system comprising:
a star-tracker reference system, wherein the star-tracker reference system comprises a first quaternion data generator;
a body control module for producing orthogonal axes body control reference torques; and
a quaternion comparator connectable to the star-tracker reference system and the body control module.

19. A quaternion format differencing system as in claim 18 wherein the body control module comprises a gyroscope reference system.

20. A quaternion format differencing system as in claim 18 wherein the quaternion comparator further comprises a converter for transforming orthogonal axes body control reference torques to quaternion format.

21. The system of claim 18 wherein the quaternion comparator is adapted to integrate IMU signals to create an attitude quaternion and use a difference between an integrated IMU quaternion and a quaternion produced by the star tracker to estimate and IMU bias.

22. The system of claim 21 wherein the IMU bias is used to correct for drift errors when the star-tracker reference is not functional.

23. At least one program storage device readable by a machine, tangibly embodying a program of instructions executable by the machine to perform method steps for:
providing non-inertial attitude reference (NAR) data derived from a non-inertial source;
providing backup inertial attitude reference (IAR) data when NAR data is not available; and
utilizing NAR data when available to correct for drift errors in IAR data.

* * * * *